Figure 1:
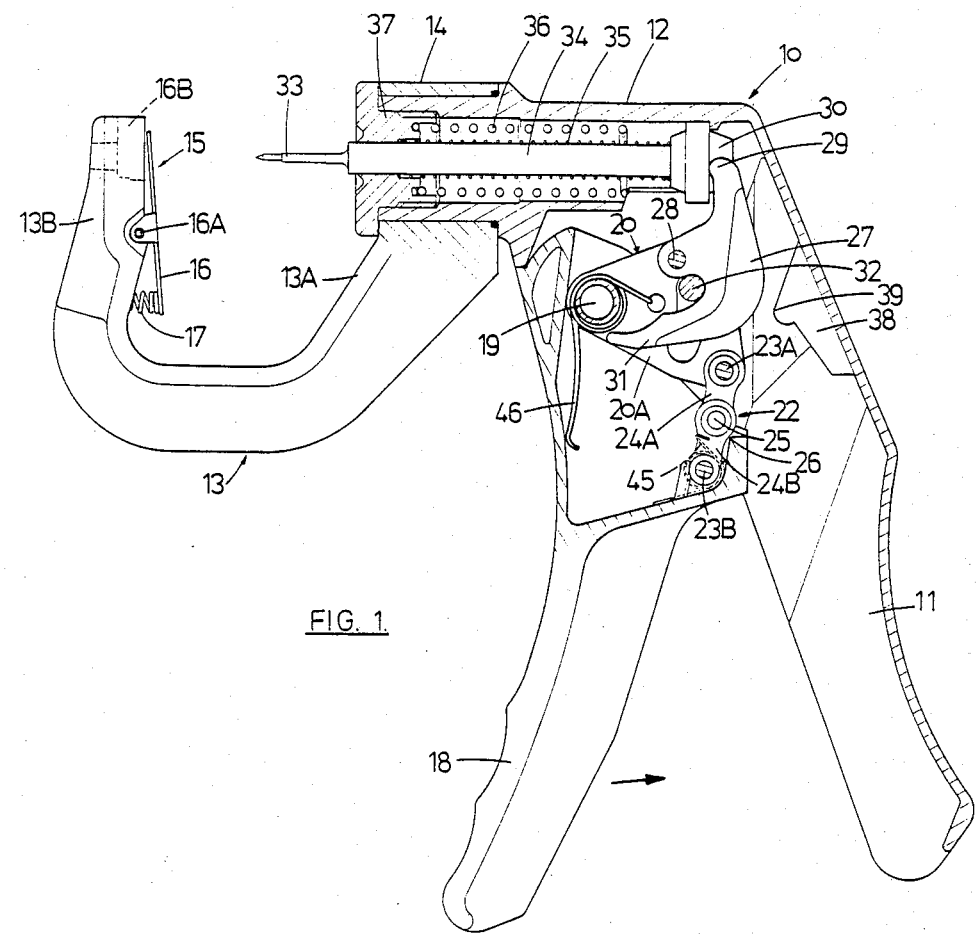

United States Patent [19]

Scott et al.

[11] Patent Number: 4,516,577

[45] Date of Patent: May 14, 1985

[54] APPLICATOR TOOL

[75] Inventors: Michael J. Scott, Fielding; Paul Slater; Lawrence H. Brooshooft, both of Palmerston North, all of New Zealand

[73] Assignee: Allflex International Limited, Palmerston North, New Zealand

[21] Appl. No.: 595,990

[22] Filed: Apr. 2, 1984

Related U.S. Application Data

[63] Continuation of Ser. No. 332,345, Dec. 18, 1981, abandoned.

[30] Foreign Application Priority Data

Dec. 22, 1980 [NZ] New Zealand .................... 195919

[51] Int. Cl.³ ............................................. A01K 11/00
[52] U.S. Cl. ..................................... 128/330; 227/144
[58] Field of Search ................... 128/330, 334 R, 325, 128/316; 227/144; 40/300, 301; 81/355–363

[56] References Cited

U.S. PATENT DOCUMENTS

| 1,759,400 | 5/1930 | Hobbs | 40/301 |
| 2,882,774 | 4/1959 | Guttfeld | 81/361 |
| 4,120,303 | 10/1978 | Villa-Massone et al. | 128/330 |
| 4,185,635 | 1/1980 | Burford et al. | 128/330 |

FOREIGN PATENT DOCUMENTS

| 230233 | 12/1959 | Australia | 81/359 |
| 0029873 | 6/1981 | European Pat. Off. | 330/ |
| 643469 | 3/1937 | Fed. Rep. of Germany | 128/330 |
| 839630 | 5/1952 | Fed. Rep. of Germany | 128/330 |
| 2464643 | 9/1979 | France | 128/330 |

Primary Examiner—Michael H. Thaler
Attorney, Agent, or Firm—Blakely, Sokoloff, Taylor & Zafman

[57] ABSTRACT

An animal ear tag applicator tool which includes spaced apart first and second retention members each of which is adapted to retain an animal ear tag part. The tool has a body to which is pivotally attached a lever. Movement of the lever toward handle of body results in rectilinear movement of the first retention member toward the second retention member. The tool is characterized by a linkage which transforms pivotal movement of the lever into a varying speed rectilinear movement of the first retention member toward the second retention member relative to the movement of the lever itself.

15 Claims, 4 Drawing Figures

APPLICATOR TOOL

This is a continuation of application Ser. No. 332,345 filed Dec. 18, 1981, now abandoned.

This invention relates to an applicator tool which is particularly suited for the application of ear tags to animals.

Many forms of applicator tools are known whereby an ear tag can be applied to the ear of an animal. The most common applicator tool is of a pliers type which comprises a pair of levers pivotally coupled together. To one side of the pivot the levers are formed as handles whilst on the other side they are formed as jaws which have retention means for retaining an animal ear tag part. Such an applicator tool is shown in our U.S. Pat. No. 3,812,859. A development of this general pliers type tool is exemplified in our U.S. Pat. No. 4,120,303 where the tool has means to cause the jaws to retract immediately the tag has been installed in the ear of the animal.

One of the problems associated with a pliers type applicator is that the jaws of the tool move on an arc which can lead to misalignment of one tag part in relation to the other during installation of the tag in the animal's ear. Accordingly, applicator tools have been developed whereby one retention means moves rectilinearly relative to the other. Such an applicator tool is disclosed in our U.S. Pat. No. 4,185,635. This applicator tool not only has one of the retention means moving rectilinearly relative to one another but also has automatic retraction means such that upon completion of installation of the tag the movable retention means retracts.

One of the criteria which must be met with an applicator tool is that there must be sufficient space between the parts of the tag when retained by the retention means to facilitate the easy positioning therebetween of the ear of an animal. One way in which this gap can be obtained is to have the jaws pivot sufficiently away from one another when the applicator tool is opened. In this manner the required gap is provided, however, the applicator is often difficult to handle due to the handles thereof being too far apart for ease of use.

An applicator tool only requires a high lever force during actual penetration of the tag into the animal's ear and the coupling of the male and female parts of the tag. This high lever force is thus only needed for part of the total relative movement of the retention means and thus the ear tag parts toward one another.

Broadly, the present invention provides an animal ear tag applicator tool comprising spaced apart first and second retention means, each of which is adapted to retain an animal ear tag part and lever means mounted for pivotal movement to facilitate movement of one of said retention means relative towards the other and characterised in that means are provided, which in use of the applicator tool, transform pivotal movement of said lever means into a varying speed rectilinear movement of the retention means relative to the movement of the lever means.

In one form of the invention the tool comprises a body having a handle. A lever is pivotally coupled to the body and is interconnected to a movable member which has said first retention means. The second retention means is preferably mounted on an anvil which is located on said body.

In a preferred form the lever is interconnected to the movable member by a linkage which comprises an arm fixedly coupled to the lever. The arm is pivotally coupled to a link member which has a cam surface engaging against a fixed guide attached to the body. The cam surface is so profiled that during linear movement of the lever about its pivot axis the link member causes the movable member to move at a speed which decreases as the first retention means approaches the second retention means.

Preferably means are provided for automatic retraction of the movable member immediately the first retention means has reached a determined distance from said fixed second retention means.

Figure 2:
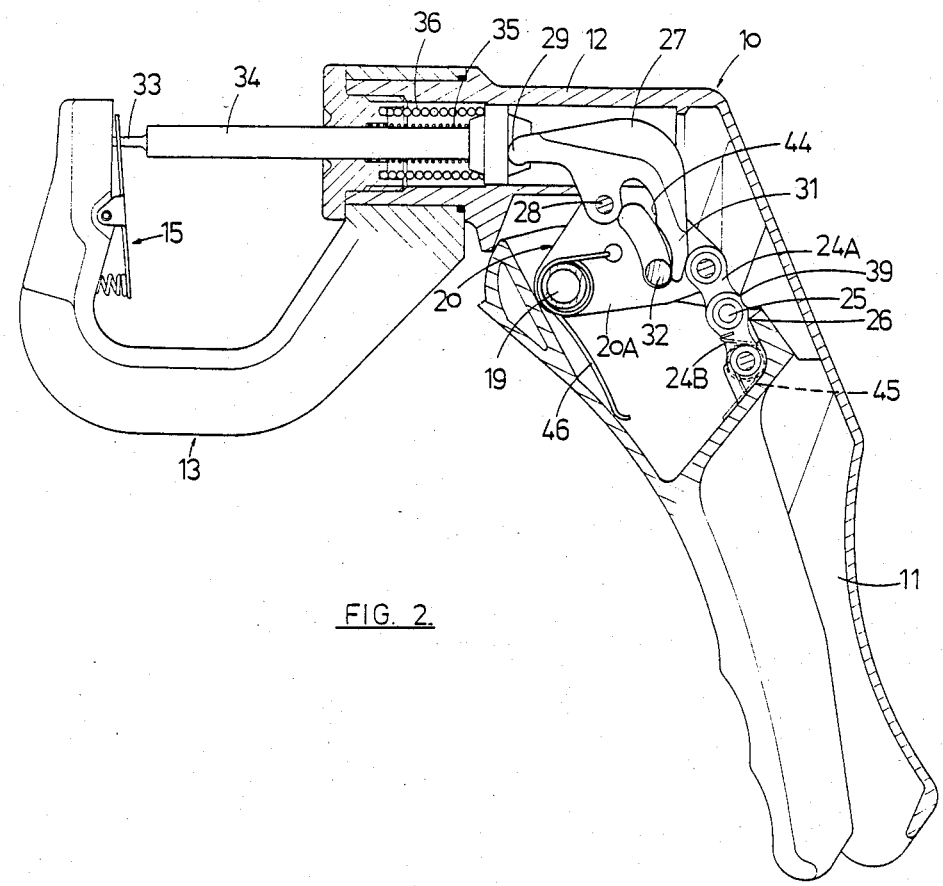
Figure 3:
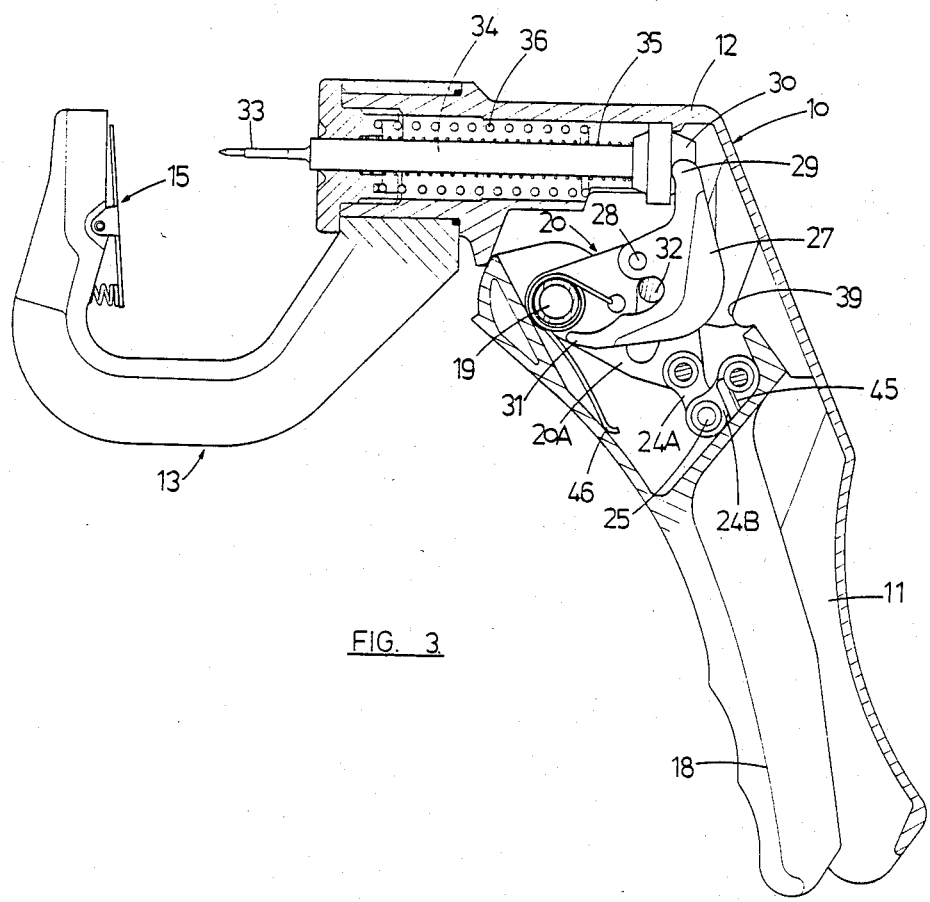
Figure 4:
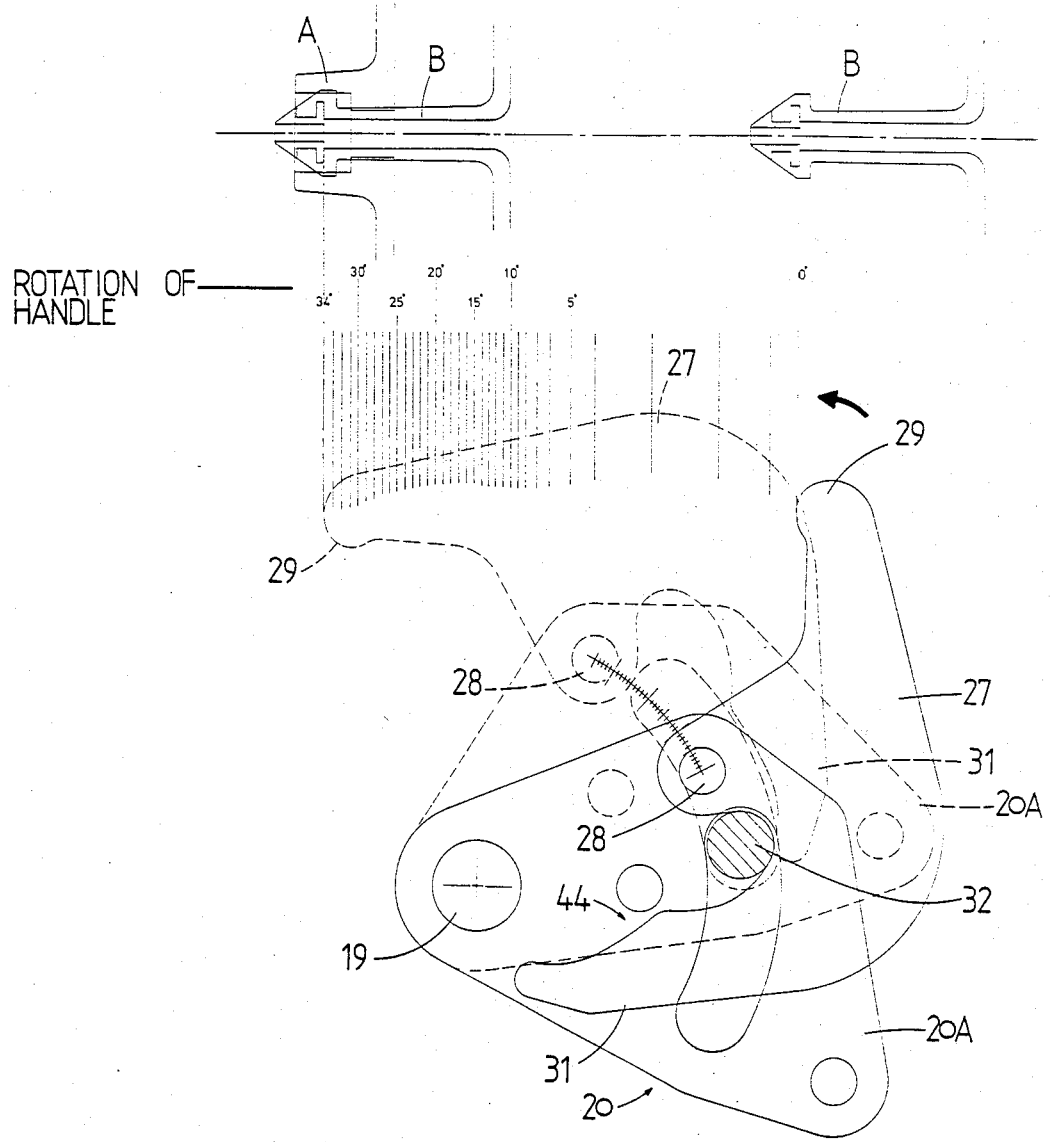

To more fully describe the invention according to a preferred form reference will be made to the accompanying drawings in which:

FIG. 1 is a partially sectioned side view of the applicator tool ready for use,

FIG. 2 is a similar view to FIG. 1 but showing the applicator at the instant the tag parts (not shown) are coupled together, FIG. 3 is a further view similar to FIGS. 1 and 2 but with the first retention means retracted after completion of application of the ear tag parts, and FIG. 4 is a detailed side view of the link member 27 and its fixed guide pin 32 which illustrates the movement of link member.

The body 10 of the applicator tool comprises a handle 11, a main body portion 12 and an anvil 13. The anvil 13 is preferably mounted to the forward end of main body portion 12 and can be rotatable thereon to facilitate adjustment of the disposition of the outer leg portion 13b relative to handle 11. Anvil 13, which is generally of U-shape when viewed side on, thus has an annular portion 14 at the end of one leg 13a thereof which is mounted on the main body portion 12. The other leg 13b of anvil 13 includes the second retention means 15 for retaining a part of an animal ear tag.

With the illustrated applicator the retention means 15 is designed to retain the female portion of a tag which can, for example, be a two piece tag of the type illustrated in U.S. Pat. No. 3,731,414 or a one piece tag of the type illustrated in U.S. Pat. No. 4,060,922. As shown, retention means 15 comprises a lever 16 pivoted at 16a approximately medially in its length. Lever 16 is biassed by a spring 17 to take up the position as shown in FIG. 1. The free end of lever 16 is located opposite a recess 16b so that the bossed portion of the female part of the ear tag can be located therein and retained by the free end of lever 16. It will be realised by those skilled in the art that retention means 15 can take many different forms depending on the type of tag to be applied.

A lever 18 is pivotally attached by one end at 19 to main body portion 12. This lever 18 is shaped into the form of a handle so that it can be comfortably gripped by the fingers of a user. The pivotted end of the lever 18 is provided with a mounting 20 which can be attached directly to lever 18, however, as shown, mounting 20 is formed as a pair of spaced apart members 20a (only one being shown because of the sectioned view) which is pivotal about the pivot pin 19 independent of lever 18. Mounting 20 is coupled to lever 18 by a linkage 22 which is pivotally coupled at one end by pivot pin 23a between mounting members 20a and at its other end by pivot 23b to lever 18. Linkage 22 is actually formed in two parts 24a and 24b which are pivotally linked together at 25 for reasons which will hereinafter become apparent. Linkage 22 takes up an "over centre" position, in a typical toggle link fashion, which is restricted by stop 26. To urge linkage 22 into engagement with stop 26 a small coil return spring 45 can be provided and extends between a fixture on lever 18 and linkage part 24b.

Mounting 20 is pivotally connected at 28 to a link member 27. This link member 27 is in turn engaged at one end at 29 with a bifurcated pressure pad 30. The other end 31 of the link member 27 is hook shaped and engages about a guide pin 32 which is fixedly mounted on the main body portion 12 and is located within a curved slot in mounting members 20a. The function of link member 27 will hereinafter be described.

The applicator as illustrated is of a type for application of tags as disclosed in the aforesaid U.S. Pat. Nos. 3,731,414 and 4,060,922. Accordingly the aforementioned first retention means is a pin 33. A member 34, which is preferably cylindrical, is mounted for sliding movement within the main body portion 12 and applicator pin 33 is mounted on the outer end thereof. As shown pin 33 can be integral with member 34. The inner end of cylindrical member 34 is provided with pressure pad 30. A first spring 35 is positioned on the cylindrical member 34 to extend between the pressure pad 30 and a bearing 37 which is mounted in main body portion 12 and in which cylindrical member 34 is slidingly mounted. The spring 35 biasses cylindrical member 34 to the position shown in FIG. 1.

An abutment 38 is mounted by main body portion 12 at or adjacent the upper end of handle 11. This abutment 38 is conveniently formed by a projection 39 formed integrally with handle 11.

The operation of the applicator tool will now be described. As lever 18 is moved in the direction of the arrow in FIG. 1 this rotary movement is imparted to mounting 20 via linkage 22. Accordingly pivot 28 moves counter clockwise about pivot 19. This causes the hook shaped end 31 of link member 27 to move about fixed pin 32 and thus pressure applied by curved end 29 to pressure pad 30 moves cylindrical member 34 toward the second retention means 15.

Referring more particularly to FIG. 4 of the drawings it will be seen that end portion of hook shaped end 31 of link member 27 is profiled to effectively form a cam surface 44 which engages with a fixed guide pin 32. Accordingly as the lever 18 is moved toward handle 11, link member 27 is not only moved by mounting 20 about pivot 19 but its attitude is altered by the interengagement of profiled cam surface 44 and fixed pin 32. This results in the transformation of a linear rotary movement of the lever 18 into a variable speed movement of pivot 29. To illustrate this FIG. 4 contains a plot of the angular displacement of lever 18 about pivot 19 in relation to the non-linear movement of pivot 29. For example, during the first 10° of movement of lever 18 the pivot 29 moves over half its full distance of throw, whilst in the final 20° of movement of lever 18, pivot 29 moves a distance which is approximately the same as that achieved in about 4°–5° movement at the initial stages of movement of lever 18.

When a tag is installed in the applicator and the animal's ear is positioned in anvil 13, applicator pin 33 is rapidly brought into contact with the ear by only a small degree of movement of lever 18. However, during installation of the tag where a high lever force is required the ratio of movement of applicator pin 33 to the movement of lever 18 alters so that a greater degree of movement of the lever is needed to move the applicator pin through its final stages of movement. The full force of the leverage is thus utilised.

When lever 18 has reached the position shown in FIG. 2, i.e. installation of the tag has been completed (see left hand side of FIG. 4 showing ear tag parts A and B coupled together), the abutment 38 abuts with linkage 22 to push the linkage over centre which allows mounting 20 to move independently of lever 18. This permits spring 35 and second spring 36 which has also been compressed to drive pressure pad 30 backward and so retract member 34 into main body portion 12 as illustrated by FIG. 3. The applicator pin 33 is thus automatically removed from the tag immediately installation of the tag has been completed. Return of lever 18 to the position shown on FIG. 1 renders the applicator ready for its next operation. A coil spring 45 is provided to force mounting 20 back into its rest position whilst spring 46 facilitates return of lever 18 to the open position.

The point at which member 34 automatically retracts could be adjusted by constructing the abutment 38 to be adjustable in position. This can be achieved by abutment 38 being an adjustable rod. Accordingly automatic retraction of pin 33 can be adjusted for the position of closest approach of pin 33 to second retention means 15 which is dictated by the completion of coupling of ear tag part A with ear tag part B.

The adjustability of anvil 13 by its ability to be rotated about main body portion 12 permits the tag to be applied from both over or under the ear of the animal whilst still maintaining body 10 in an upright orientation. Means can be provided for locking the anvil in various positions if required.

Different forms of linkage between the lever 18 and the movable element, in this case member 34, can be devised to transform the linear movement of the lever 18 into a non-linear movement of the movable member. In addition the profile of cam surface 44 of link member 27 can be altered to provide different variations in the ratio of speed of movement of the movable member relative to the lever.

The invention provides an applicator tool whereby the first retention means moves during initial operation of the tool rapidly toward second retention means 15 but then slows down during the actual installation of the tag to the animal's ear. This means that during initial operation of the tool the lever 18 only needs to be moved a small distance for a considerable advancement of the first retention means. However, during the critical installation procedure a far greater degree of movement of the lever is required to achieve the necessary movement of the headed stem of the male component B of the tag through the animal's ear and into its coupling arrangement with the female component A of the tag.

The applicator tool according to the invention thus has retention means which are sufficiently spaced apart to permit ready positioning on an animal's ear therebetween. In addition, however, there is provided the added advantage of an applicator tool having a lever ratio which is higher than that obtained with equivalent sized known applicators. For example, most known applicators have a lever ratio of approximately 2:1 and adequate space for the positioning of the animal's ear between the tag parts when installed in the applicator. Usually any increase in the space between the ear tag parts results in a lowering of the lever ratio especially if the applicator tool is to remain of dimensions which are easily handled by the user. With the applicator of the present invention a good distance between the ear tag parts is achieved without any sacrifice of the lever ratio. In fact, the applicator can have a lever ratio at the actual installation of the tag in the order of 3:1. This means that the high lever ratio is attained at the precise moment it is required which is at installation of the tag.

The applicator tool according to this invention can be used in applications other than applying a tag to an animal. For example, the tool can equally be used as an applicator for rivet or like fastenings after suitable modifications.

We claim:

1. An animal ear tag tool for applying an ear tag characterized by comprising a body including a first retention means for a first part of said tag, a second retention means for a second part of said tag, said first retention means including a first portion facing said second retention means and a second portion adjacent to said first portion, a pivoted lever pivotally mounted on said body, around a first pivot mount, means for transferring movement of said lever into movement of said second portion of said first retention means, said means for transferring being pivotal about a second pivot mount, said second pivot mount being movable in response to pivotal movement of said lever, said means for transferring being engaged with said second portion of said first retention means, guiding means comprising a cam surface and a cam follower, one of which is mounted with said means for transferring, and the other of which is fixed on said body, said cam surface having a profile which imparts variable speed motion to said second portion of said first retention means, said variable speed motion decreasing as said first portion approaches said second retention means.

2. An applicator tool as claimed in claim 1, characterized in that the means for transferring comprises a link member having a contact surface engaged with a bearing surface disposed on said second portion of said first retention means, said second portion comprising a movable member, said contact surface being located at a point spaced from said second pivot mount.

3. An applicator tool as claimed in claim 2, characterized in that the cam surface is formed as part of said link member, and said second pivot mount of the link member is situated between said cam surface and said contact surface.

4. An applicator tool as claimed in claim 3, characterized in that said cam follower is a fixed guide member having an arcuate surface which is contacted by the cam surface.

5. An applicator tool as claimed in claim 4, characterized in that the movable member is located within said body, the second retention means is located on an anvil which is mounted on said body, there being a handle fixed to the body and said lever being mounted co-operatively with said handle.

6. An applicator tool as claimed in claim 2, characterized in that said link member is coupled to an arm, said arm is pivotally mounted about said first pivot mount of said lever, but is restrained against pivotal movement by coupling means.

7. An applicator tool as claimed in claim 6, characterized in that it further includes spring means biasing the movable member away from said second retention means, and actuating means capable of releasing said coupling means.

8. An applicator tool as claimed in claim 7, characterized in that said coupling means comprises a pair of elongate links pivoted end to end with their other ends respectively pivotally coupled to the arm and lever.

9. An applicator tool as claimed in claim 8, characterized in that said arm includes a bifurcated portion within which said link member and the end of said elongate links are pivotally mounted, said bifurcated portion further including an arcuate slot through which said cam follower locates to contact said cam surface.

10. An applicator tool as claimed in claim 8, characterized in that the actuating means is an abutment on said handle.

11. An applicator tool as claimed in claim 8, characterized in that the first retention means is a pin and the second retention means is a spring clip.

12. An applicator tool as claimed in claim 7, characterized in that the actuating means is an abutment on said handle.

13. An applicator tool as claimed in claim 7, characterized in that the first retention means is a pin and the second retention means is a spring clip.

14. An applicator tool as claimed in claim 2, characterized in that the movable member is cylindrical in shape and is slidingly located within a guide housing in the body of the tool, said first portion of the first retention means is mounted at one end of the cylindrical member and the bearing surface is provided at the other end of the cylindrical member.

15. An applicator tool as claimed in claim 1, characterized in that said second retention means is located in a fixed position.

* * * * *